United States Patent
Baginski

[11] 3,842,688
[45] Oct. 22, 1974

[54] FOOT RETAINING DEVICE FOR A BICYCLE PEDAL

[75] Inventor: Martin R. Baginski, Austinburg Twp., Ohio

[73] Assignee: Ashtabula Bow Socket Company, Ashtabula, Ohio

[22] Filed: June 29, 1972

[21] Appl. No.: 267,439

[52] U.S. Cl.............. 74/594.6, 24/16 PB, 24/174, 24/206 A
[51] Int. Cl............................................ G05g 1/14
[58] Field of Search....... 74/594.6, 594.4; 24/16 PB, 24/30.5 P, 174, 176, 186, 206 A

[56] References Cited
UNITED STATES PATENTS

| | | | |
|---|---|---|---|
| 3,592,076 | 7/1971 | Baginski........................ | 74/594.6 X |
| 3,731,347 | 5/1973 | Caveney et al. ................. | 24/16 PB |

FOREIGN PATENTS OR APPLICATIONS

| | | | |
|---|---|---|---|
| 1,118,606 | 6/1956 | France............................ | 24/206 A |
| 169,149 | 2/1951 | Austria ............................ | 74/594.4 |
| 820,393 | 9/1959 | Great Britain..................... | 74/594.6 |

*Primary Examiner*—Samuel Scott
*Assistant Examiner*—F. D. Shoemaker

[57] ABSTRACT

A strap for use with a bicycle pedal to retain a rider's foot thereon comprises a first and a second elongated resilient strap portion each of which are secured to the bicycle pedal. The first and second strap portions are moveable between a locked position and a released position. When the strap portions are in the locked position, the cyclist's foot is retained on the pedal and any lateral movement of the first and second strap portions is prohibited. In the released position, the first and second strap portions are released from each other so that the cyclist's foot is no longer retained on the pedal thereby. The first strap portion has at least one aperture therein. The second strap portion has a protrusion which is positionable in one of the apertures in the first strap portion to prohibit relative lateral movement between the first and second strap portions created by the cyclist's foot during use of the pedal. The second strap portion also includes retainer means for retaining the first and second strap portions in the locked position and is releasable upon exertion of a force on one of the strap portions in a direction other than a lateral direction.

2 Claims, 6 Drawing Figures

PATENTED OCT 22 1974  3,842,688

FOOT RETAINING DEVICE FOR A BICYCLE PEDAL

The present invention relates to a strap device and more particularly a strap device for retaining a foot on a bicycle pedal.

Straps for holding a cyclist's foot on a bicycle pedal are known. Such straps allow for increased efficiency during operation of a bicycle. When a cyclist pedals a bicycle without the use of foot straps, he can only exert a force during the downward stroke of the pedal. When a foot strap is used in conjunction with the pedal, the cyclist can, in addition to the force exerted during the downward stroke of the pedal, also exert a force on the strap during the upward stroke of the pedal to thereby provide a further additional driving force.

When the cyclist's foot is secured to the bicycle pedal, safety becomes a prime consideration. During operation of the bicycle, certain emergency situations arise in which it is desireable for the cyclist to quickly release his foot from being retained on the bicycle pedal by the strap. On the other hand, it is important that such a releasing mechanism retain the foot in contact with the bicycle pedal regardless of the upward force exerted by the foot, since different cyclists are capable of exerting different upward forces on the strap. Another important consideration of such a foot retaining strap is that the strap must be adjustable in size so as to accommodate different foot sizes.

The foot straps of the prior art, such as shown in British Pat. No. 820,393, and French Pat. Nos. 568,621 and 617,044, provide straps which are adjustable to the size of the rider's foot. But none of these prior art references provide a foot strap which may be quickly and predictably released to thereby insure that the cyclist's foot will be freed from the pedal. In all of these prior art designs, a complicated manipulation is required to open the foot strap so that the cyclist's foot is released from the pedal.

Another design of the prior art, as described in Mills, British Pat. No. 6,577, provides a foot strap which is capable of retaining a rider's foot on the pedal and releasing his foot from contact therefrom upon exertion of a substantial force. In certain cases a substantial force is exerted on a foot strap by a cyclist capable thereof. A strap of such a design will separate and disconnect and become ineffective by exertion of such a substantial force thereon. In addition, such a foot strap design is inherently subject to fluctuations in the force required to release the rider's foot.

The present invention provides a strap for retaining a cyclist's foot on a bicycle pedal which is capable of quickly releasing the cyclist's foot from the pedal when desired without requiring complicated manipulation therewith. The present invention also provides a strap which is adjustable so as to accommodate and retain cyclist's feet of various sizes. Such a design provides for increased safety of the cyclist.

In order to provide these advantageous features, the strap of the present invention includes a first elongated strap portion which is secured to the bicycle pedal and has a plurality of openings therein. The plurality of openings allow for various foot sizes to be accommodated and retained on the pedal by selecting the proper aperture which will assure a snug fit of the cyclist's foot between the strap portions and the pedal. The strap of the present invention also has a second elongated resilient strap portion which is secured to the bicycle pedal.

The first and second strap portions are positionable in a locked position in which the cyclist's foot is retained on the pedal and the first and second strap portions resist lateral forces exerted thereon. The first and second strap portions are moveable from the locked position to a released position in which the cyclist's foot is released from being retained on the pedal. The second strap portion has a protrusion which is positionable in one of the apertures of the first strap portion to prohibit relative lateral movement between the first and second strap portions when in the locked position.

Retainer means for retaining the first and second strap portions in the locked position is provided. The retainer means is releasable upon exertion of a force on one of the strap portions in a direction other than lateral direction. When such a force is exerted, the first and second strap portions will be released from the locked position and thereby a quick release device is provided to release the cyclist's foot from the bicycle pedal.

Accordingly, it is an object of the present invention to provide a new and improved strap for retaining a cyclist's foot on a bicycle pedal which provides for safety of the cyclist by allowing for the quick release of the cyclist's foot from the pedal.

It is a further object of the present invention to provide a new and improved strap for retaining a cyclist's foot on a bicycle pedal which strap is moveable between a locked position in which position the cyclist's foot is retained on the pedal and a released position in which position the cyclist's foot is released from being retained on the pedal and which strap includes a retaining means for retaining the strap in the locked position and includes a quick release feature wherein the strap may be and for providing for the quick and safe release of the strap from the locked position to the released position.

It is yet a further object of the present invention to provide a strap for retaining a cyclist's foot on a bicycle pedal which strap is capable of adjustment for various sizes of the cyclist's foot.

Further objects, advantages and features of the present invention will be apparent to those skilled in the art to which it relates from the following detailed description made with reference to the accompanying drawings forming a part of the specification and in which.

Figure 1:
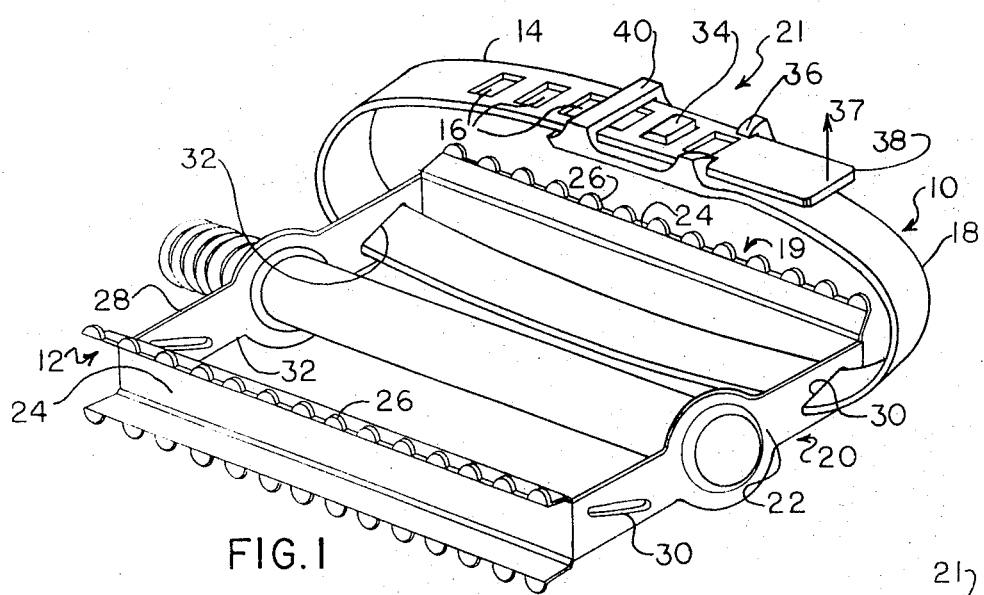
FIG. 1 is a perspective view of a representative bicycle pedal having a strap for retaining a cyclist's foot thereon.

The present invention provides a device for retaining a cyclist's foot on a bicycle pedal. The foot retaining device of the present invention provides the advantageous safety feature of allowing for the quick release of the cyclist's foot from the bicycle pedal and is adjustable so as to accommodate cyclist's feet of various sizes. The present invention may be applied to foot retaining devices of a wide variety of constructions and designs and for purposes of illustration is described in the drawings as applied to a foot retaining device or strap 10 for retaining a cyclist's foot on a bicycle pedal 12 as shown in FIG. 1.

The foot retaining device 10 for the bicycle pedal 12 is utilized to retain a rider's foot on the pedal. The foot retaining device 10 includes a first elongated resilient strap portion 14 which is secured to the bicycle pedal 12 and has a plurality of apertures 16 therein. The foot retaining device 10 also includes a second elongated resilient strap portion 18 secured to the bicycle pedal 12.

As shown in the embodiment of FIG. 1, the first and second elongated resilient strap portions 14, 18 are formed together as a continuous strap so as to implement securement thereof to the pedal 12 as will hereinafter be more fully described. It should be understood though that dependant on particular pedal designs with which the foot retaining device of the present invention is used in conjunction, other means for securing the first and second strap portions 14, 18 may be desirable and thereby require the first and second strap portions 14, 18 to be formed as individual pieces.

The pedal 12 of FIG. 1 is of the "rat trap" design. "Rat trap" pedals are generally used with light weight bicycles which are particularly designed for racing or touring purposes due to their lighter weight.

In any bicycle, and even more particularly in a racing bicycle it is desirable to exert the greatest amount of driving force of the bicycle pedal 12 to propel the bicycle at a greater speed. During the downward movement of the cyclist's foot a downward force is exerted by the cyclist's foot on the foot supporting surface 19 of the bicycle pedal 12 to thereby propel the bicycle. During upward movement of the cyclist's foot, a foot retaining device 10 is provided to transmit an upward force on the pedal 12 so that the cyclist drives the bicycle even when the pedal is moving in the upward direction.

The "rat trap" type pedal 12, shown in FIG. 1, has a "U" formed frame member 20 with an outboard portion 22 and side portions 24. The side portions 24 have foot supporting ridges 26 comprising a portion of the foot supporting surface 19. The ridges 26 serve to provide a non-slip surface for supporting the cyclist's foot. The pedal 12 provides an end brace member 28 on the inboard side of the pedal, which is secured in any conventional manner to the frame 20 as is well known to those skilled in the art. The outboard portion 22 and the end brace member 28 have openings 30, 32 respectively therein.

To secure the first and second strap portions 14, 18 to the bicycle pedal 12, the strap 10 is received by the openings 30, 32. It should be noted that the slots or openings 30, 32 may be formed in their respective members 20, 28 at a predetermined angle so as to receive a cyclist's foot in a predetermined manner.

For example, if the strap 10 is positioned in the slots as shown in FIG. 1, it will be more difficult to insert the cyclist's foot in the strap 10 but on the other hand, it may not be easily removed from contact with the pedal 12 without releasing the strap as will be hereinafter described. On the other hand, if the strap 10 is positioned in the opposite angular position, it will be easy to insert the cyclist's foot between the strap 10 and the pedal 12 and also easy to withdraw the foot therefrom without releasing the strap.

The strap 10 of the present invention provides the safety feature of enabling the cyclist to quickly release his foot from the bicycle pedal 12. This safety feature is effectuated by providing the first and second strap portions 14, 18 to hold the cyclist's foot on the pedal 12. The strap portions 14, 18 are moveable between a locked position, in which position a cyclist's foot is retained on the pedal 12, and a released position in which the cyclist's foot is released from being retained on the pedal by the strap 10.

Means, generally indicated at 21, are provided to attach the first and second strap portions 14, 18 together in the locked position while allowing for quick release of the first and second strap portion from the locked position. The attaching means 21 includes a protrusion 34 on the second strap portion 18 which is positionable in one of the apertures 16 in the first strap portion 14.

It should be noted that the particular aperture 16 in which the protrusion 34 is positioned is dependant on the size of the cyclist's foot. For example, if the cyclist's foot is small, an aperture 16 will be selected which provides a small opening for the cyclist's foot to thereby more effectively retain the cyclist's foot on the pedal. When the protrusion 34 is received by one of the apertures 16 the coaction therebetween prohibits relative lateral movement of the first and second strap portions 14, 18 as will be hereinafter described.

The attaching means 21 also includes retainer means, generally indicated at 36, for retaining the first and second strap portions 14, 18 respectively in the locked position and is releasable upon exertion of a force on one of the strap portions 14, 18 in the direction other than a lateral direction.

For example, when a cyclist's foot is moving in an upward direction, an upward force is exerted on the bicycle pedal 12 through the strap 10. Such an upward force produces a lateral force between the first and second strap portions 14, 18 which tends to separate the first and second strap portions. The lateral force is resisted by the coaction between the protrusion 34 and the opening 16 in which the protrusion is positioned to eliminate any relative lateral movement between the first and second strap portions 14, 18. Since the first and second strap act as a unit to hold the cyclist's foot when in the locked position, they are capable of transmitting a driving force to the bicycle pedal 12.

The retainer means 36 retains the first and second strap portions 14, 18 in their respective positions, as shown in FIG. 1, when transmitting a force from the cyclist's foot to the pedal 12. The retainer means 36 also allows for releasing the first strap portion 14 from the second strap portion 18 when a force is exerted on one of the strap portions in a direction other than the lateral direction.

For example, when an upward force, indicated at 37, is exerted on the end 38 of the first strap portion 14, the retainer means will release the first strap portion 14 and the protrusion 34 will consequently no longer be engaged by one of the apertures 16. The strap 10 will then be in a released position so that the force of a cyclist's foot will easily and quickly allow the cyclist to remove his foot therefrom.

On the other hand, when the strap portions 14, 18 are in the locked position and lateral forces are exerted between the strap portions, no matter how large those lateral forces are within practical limits, the protrusion coacting with the aperture 16 will prohibit such lateral movement. Thus, fluctuations in the force exerted by the cyclist's foot will not disengage the strap portions 14, 18. The strap 10 may be used for cyclists of various sizes and capabilities while providing the safety feature of a quick release which allows the strap 10 to move from a locked position to a released position so that the cyclist's foot may be easily removed from contact with the pedal 12 when desired such as upon any impending danger.

The second strap portion 18 also includes guide means 40 for guiding the first strap portion 14 with respect to the second strap portion 18. The guide means 40 also prevents torsional movement between the first strap portion 14 and the second strap portion 18 as will be hereinafter be described.

Figure 2:
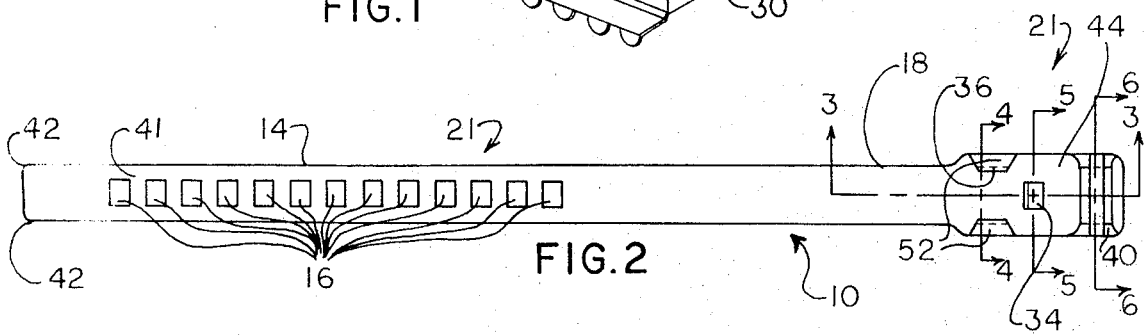
FIG. 2 is a side elevational view of a strap embodying the present invention.

The strap 10, embodying the present invention, is shown in FIG. 2. The strap 10 has a first strap portion 14 and a second strap portion 18 which cooperates in a manner as will be hereinafter described to be moveable between a locked position and a released position. When in a locked position, the first and second strap portions 14, 18 are locked together to form a loop. This loop is not separable by tension or lateral forces on the strap portions 14, 18. When a force is exerted normal to the direction of the tension force, the first and second strap portions 14, 18 will be released so that a loop is no longer defined thereby.

The present invention provides an attaching means 21 to releasably connect the first and second strap portions 14, 18 respectively in the manner hereinabove described. The attaching means 21 includes the plurality of apertures 16 in the first elongated resilient strap portion 14. The strap portion 14 has a pair of opposing lateral surfaces 41 and a pair of opposing side surfaces 42 having a curvilinear shape. The apertures 16 pass between and through the lateral surfaces 40. The apertures 16 have a geometric configuration which matches with the protrusion 34 to allow cooperation therebetween. It must be understood that indentations having a shape complimentary to the protrusion 34 may be considered as apertures in the first strap portion 14.

The attaching means 21 also includes the protrusion 34, retainer means 36, and a guide means 40 on the second strap portion 18. The retainer means 36 and guide means 40 are positioned on opposite sides of the protrusion 34 as shown in FIGS. 1 and 2. The strap portion 18 is enlarged at the end thereof to accommodate the attaching means 21.

Figure 3:
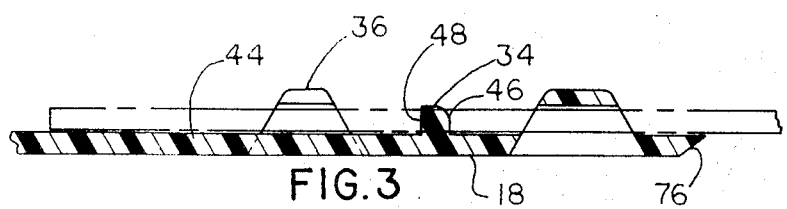
FIG. 3 is a fragmentary sectional view of the strap shown in FIG. 2 and taken along lines 3—3 thereof.
Figure 5:
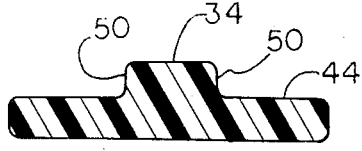
FIG. 5 is a sectional view of the strap shown in FIG. 2 and taken along lines 5—5 thereof.

The protrusion 34 is provided to prevent lateral movement between the strap portions 14, 18. The protrusion 34 extends from the lateral surface 44 of the second strap portion 18 as shown in FIG. 3. The protrusion 34 has a curvilinear side surface 46 and opposing side surface 48 which is substantially perpendicular to the lateral surface 44. The protrusion 34 is also defined on the other sides by another pair of opposing side surfaces 50, as shown in FIG. 5, which extends from the lateral surface 44 of the second strap portion 18. The protrusion 34 is formed integrally with the second strap portion 18. When the protrusion 34 is received by one of the apertures 16, movement between the lateral surfaces 40, 44 is prohibited except when that lateral force is sufficient to break one of the strap portions 14, 18.

Figure 4:
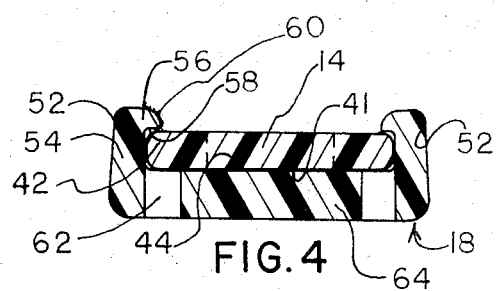
FIG. 4 is a sectional view of the strap shown in FIG. 2 and taken along lines 4—4 thereof.

The retainer means 36 is provided to retain the first strap portion 14 in engagement with the protrusion 34 while allowing for quick release therefrom. The retainer means 36 includes a pair of extension portions 52, as shown in FIG. 2 and in section in FIG. 4, extending from the lateral surface 44 of the strap portion 18. The extensions 52 are identically formed in an opposing direction, as seen in FIG. 4, and for purposes of simplicity of description, only one of the extensions 52 will be hereinafter described.

The extension 52 includes an upright portion 54 extending from the plane of the lateral surface 44 of the second strap portion 18. The upright portion 54 terminates in a lip 56 which has a retaining surface 58 extending substantially horizontal to the lateral surface 44. The retaining surface 58 acts to retain first strap portion 14 in a locked position as shown in FIG. 4, the retaining surface 58 bears against the lateral surface 40 to hold the lateral surface 40 adjacent to the lateral surface 44 of the second strap portion 18.

To allow for movement between the locked position and the released position, the lip portion 56 is provided with an angularly shaped surface 60 which allows the side surface 42 of the first strap portion 14 to be guided into the locked position. Once the first strap portion 14 is in the locked position, the retaining surface 58 retains the strap portion 14 therein. Openings 62 are provided between the extension 52 and the central portion 64 of the second strap portion 18 to allow second strap portion 18 to flex and the extensions 52 to move to increase the distance between the extension 52. Such an expansion between the extensions 52 allows the first strap portion 14 to enter into the locked position. When the distance between the extensions 52 is sufficiently increased, the first strap portion 14 will be engaged in the locked position by the second strap portion 18 as shown in FIG. 4 and in phantom lines at FIG. 3.

At this point it should be understood that the strap 10 is formed from a resilient and flexible material such as a synthetic plastic. Various plastic materials allow for a certain degree of flexibility which, when formed into the strap 10, allow the extension 52 to expand when a force is exerted thereon by the first strap portion. It is important to note that the plastic used must hav sufficient "memory" for the extensions 52 to return to their original positions. Such a biasing force is necessary to properly lock the first and second portions 14, 18 together. It should be understood that other biasing means may be provided and are within the scope of the present invention. It further should be understood that the flexibility and resiliency of such strap material may be varied by changing the composition thereof. It should be understood that the strap 10 has radii in various corners of the strap 10 so as to relieve stresses in those particular areas.

Figure 6:
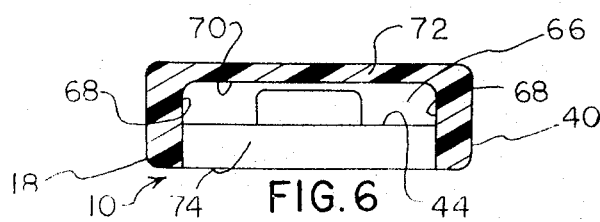
FIG. 6 is a sectional view of the strap shown in FIG. 2 and taken along lines 6—6 thereof.

The attaching means 21 also includes the guide means 40 shown in section in FIG. 6. The guide means 40 defines an opening 66 above the lateral surface 44 of the end portion of the second strap member 18. The opening 66 is defined by the side walls 68 and the upper wall 70. The walls 68, 70 are defined by the housing portion 72 which extends from the lateral surface 44 of the second strap portion 18. An opening 74 is provided below the housing portion 72 to accommodate molding of the strap 10. The lateral surface 44 defines the lower portion of the opening 66 and extends in an lateral direction from both sides of the opening 74.

The protrusion 34 is spaced between the guide means 40 and the retaining means 36 so that when the strap portions 14, 18 are retained in the locked position, either relative linear or rotational movement is restricted.

The strap 10 of the present invention may be attached to the pedal 12 by positioning the strap 10 through the openings 32 in the pedal 12 as shown in FIG. 1. It should be understood that other attaching and securement devices may be utilized. The cyclist's foot is then positioned on the foot receiving surface 19 and the first and second strap portions 14, 18 are drawn around the cyclist's foot. A tapered portion 76, as shown in FIG. 3, is provided on the second strap portion 18 so as to provide a more comfortable fit when the cyclist's foot is retained thereby and also accommodate easy securement of the first and second strap portions 14, 18 respectively.

The end 38 of the first strap portion 14 is then inserted in the opening 66 of the guide means 40 and pulled therethrough until the first and second strap portion 14, 18 are snug against the cyclist's foot which is also in contact with the bicycle pedal 12. One of the apertures 16 is positioned over the protrusion 34 and the retaining means 36 when such a snug fit is realized. The first strap portion 14 is then pushed toward the second strap portion 18 so that the curvilinear side walls 42 coact with the angular surfaces 50 of the extensions 52. The extensions 52 move until the lateral surfaces 40, 44 are adjacent to each other. The first strap portion 14 is retained in that position by the retaining surfaces 58 of the extensions 52.

Simultaneous with such movement into the locking position, the selected aperture 16 for providing a snug fit is moved into engagement with the protrusion 34 so that the protrusion is received therein. The coaction between the protrusion 34 and selected aperature 16 provide for locking between the strap portions 14, 18.

In such a locked position, the rider's foot is retained on the bicycle pedal 12 to allow a force to be exerted during an upward stroke of the bicycle pedal 12 as hereinabove described. During such an upward stroke, lateral forces in the plane of the lateral surfaces 40, 44 are exerted on the first and second strap portions 14, 18 by the cyclist's foot. Such lateral forces are prohibited from creating movement of the first and second strap portions 14, 18 by the coaction of the protrusion 34 and the aperture 16 with which the protrusion is positioned.

The guide means 40 prohibits relative pivotal movement between the first and second strap portions and also prohibits disengagement of the selected aperture 16 with the protrusion 34. In such a locked position, the retaining means 36 holds the strap portions 14, 18 in the locked position on the other side of the protrusion 34 so that the strap portions will not be inavertantly disengaged.

When it is desirable to move the first and second strap portions 14, 18 to a disengaged or released position, a force indicated at 37 is exerted by the cyclist on the end portion 38 of the first strap portion 14. The force 37 forces the curvilinear side surfaces 42 of the first strap portion 14 against the retaining surface 58 which in turn forces the extensions 52 to move outwardly. Outward movement of the extensions 52 allow the first strap portion 14 to become disengaged from the second strap portion 18.

Simultaneous with such movement, the aperture 16 which is engaged by the protrusion 34 becomes disengaged therewith.

When the strap portions 14, 18 are in such a released position, the first strap portion 14 is free to move through the opening 66 of the guide means 40 by the force exerted thereon by the cyclist's foot. The first and second strap portions 14, 18 then move away from each other and the opening defined thereby expands. As the opening expands the cyclist's foot is free to be removed from the bicycle pedal 12. Such a quick release feature of quick and easy removal of the cyclist's foot from the pedal 12 when an emergency situation arises provides an important safety feature. In addition the strap 10 maintains the cyclist's foot on the bicycle pedal during normal operation thereof regardless of the forces exerted on the upward stroke.

From the above it is apparent that the present invention provides a foot retaining device 10 for a bicycle pedal 12 to retain a rider's foot thereon. The foot retaining device 10 comprises a first elongated strap portion 14 secured to the bicycle pedal 12. The strap portion 14 has a plurality of apertures 16 therein. The strap 10 also includes a second elongated strap portion 18 which is secured to the bicycle pedal 12. The first and second strap portions 14, 18 are moveable between a locked position in which position a cyclist foot is retained on the pedal 12 and a released position in which position the cyclist's foot is released from being retained by the pedal 12 by the first and second strap portions 14, 18 respectively. The second strap portion 18 has a protrusion 34 which is positionable in one of the apertures 16 of the first strap portion 14 to prohibit lateral movement between the first and second strap portions 14, 18. The second strap portion 18 also includes a retainer means 36 for retaining the strap portions 14, 18 in a locked position and is releasaeable upon exertion of a force on one of the strap portions in a direction other than a lateral direction.

Having described my invention, I claim:

1. An apparatus comprising a bicycle pedal and a foot retaining device to retain a cyclist's foot on said bicycle pedal and provide for quickly releasing the cyclist's foot from said pedal, said foot retaining device comprising an elongated resilient strap member having first and second strap portions, said bicycle pedal having a plurality of pedal frame members having inboard, outboard and side portions, said inboard and outboard portions of said frame members having openings therethrough for receiving said strap member therein and securing said strap member thereto, said first elongated resilient strap portion having at least one aperture therein, said first and second strap portions movable between a locked position in which position the cyclist's foot is retained on said pedal and a released positio in which position the cyclist's foot is released from being retained on said pedal by said first and second strap portions, said second strap portion having guide means for restraining relative movement between said first and second strap portions when in the locked position, a protrusion positionable in said one aperture of said first strap portion to prohibit relative movement in a lateral direction between said first and second strap portions when in the locked position, and retainer means for retaining said first and second strap portions in the locked position and releasable upon exertion of a force on one of said strap portions in a direction other than a lateral direction to allow for a quick release of the cyclist's foot, said retainer means including opposing extensions, at least one of said extensions movable upon movement of said first and second strap portions between the locked and the released position, said second strap portion having means defining apertures adjacent to each of said opposing extensions to allow said extensions to flex upon movement of said first and second strap portions between the locked and released position and wherein said extensions include a surface coacting with a surface of said first strap portion to retain said first and second strap portions in the locked position.

2. An apparatus comprising first and second elongated resilient strap portions secured to a bicycle pedal for retaining a cyclist's foot on the pedal, said first elongated strap portion having at least one aperture therein, said first and second strap portions movable between a locked position in which position a cyclist's foot is retained on the pedal and a released position in which position the cyclist's foot is released from being retained on the pedal by said first and second strap portions, said second strap portion having guide means for restraining relative movement between said first and second strap portions when in the locked position, a protrusion positionable in said one aperture of said first strap portion to prohibit relative movement in a lateral direction between said first and second strap portions when in the locked position, said retainer means for retaining said first and second strap portions in the locked position and releasable upon exertion of a force on one of said strap portions in a direction other than a lateral direction to allow for a quick release of the cyclist's foot, said retainer means including opposing extensions, at least one of said extensions movable upon movement of said first and second strap portions between the locked and the released position, said second strap portion having means defining apertures adjacent to each of said opposing extensions to allow said extensions to flex upon movement of said first and second strap portions between the locked and released position and wherein said extensions include a surface coacting with a surface of said first strap portion to retain said first and second strap portions in the locked position.

* * * * *